(12) United States Patent
Swanson (10) Patent No.: US 11,973,269 B2
(45) Date of Patent: Apr. 30, 2024

(54) TERA-SAMPLE-PER-SECOND ARBITRARY WAVEFORM GENERATOR

(71) Applicant: United States of America as represented by the Secretary of the Navy, San Diego, CA (US)

(72) Inventor: Paul D. Swanson, Santee, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 191 days.

(21) Appl. No.: 17/726,365

(22) Filed: Apr. 21, 2022

(65) Prior Publication Data
US 2023/0344137 A1    Oct. 26, 2023

(51) Int. Cl.
| | |
|---|---|
| H01Q 1/42 | (2006.01) |
| H01Q 13/20 | (2006.01) |
| H04B 1/04 | (2006.01) |
| H04B 1/16 | (2006.01) |
| H04L 25/02 | (2006.01) |
| H04L 25/08 | (2006.01) |

(52) U.S. Cl.
CPC ........... *H01Q 13/206* (2013.01); *H01Q 1/422* (2013.01); *H04B 1/04* (2013.01); *H04B 1/1607* (2013.01); *H04L 25/0272* (2013.01); *H04L 25/085* (2013.01); *H04B 2001/0408* (2013.01)

(58) Field of Classification Search
CPC ........ H01Q 1/422; H01Q 13/206; H04B 1/04; H04B 1/1607; H04B 2001/0408; H04L 25/085; H04L 25/0272; H03K 3/38; H03K 3/64; H03K 17/92; H03K 19/195; H03K 19/1952; H03K 2217/0036; H03K 2217/94094
See application file for complete search history.

(56) References Cited

U.S. PATENT DOCUMENTS

| | | | | |
|---|---|---|---|---|
| 6,507,234 | B1* | 1/2003 | Johnson | H03K 3/38 |
| | | | | 327/186 |
| 10,122,350 | B2* | 11/2018 | Miller | H03K 3/38 |
| 11,342,921 | B1* | 5/2022 | Whiteley | G06N 10/40 |
| 11,476,842 | B1* | 10/2022 | Bhattacharya | G06N 10/00 |
| 11,641,194 | B1* | 5/2023 | Whiteley | H10N 60/10 |
| | | | | 327/199 |

OTHER PUBLICATIONS

Kim, Chanwoo et al.; High Frequency Arbitrary Waveform Generator Using a Nonlinear Transmission Line; Microw Opt Technol Lett, pp. 1204-1208; 2020.

* cited by examiner

*Primary Examiner* — Tung X Le
(74) *Attorney, Agent, or Firm* — Naval Information Warfare Center, Pacific; Kyle Eppele; J. Eric Anderson (57) ABSTRACT

A tera-sample-per-second waveform generator comprising: a first transmission line having a terminated end and an output end; an anti-reflection load coupled to the terminated end of the first transmission line; a plurality of current sources, wherein each current source is configured to inject current into the first transmission line; and a second transmission line configured to feed the first transmission line with a seed signal through the plurality of current sources such that the second transmission line has a different time delay between current sources than the first transmission line, wherein the seed signal triggers the current sources to inject current into the first transmission line in order to generate an output waveform.

20 Claims, 8 Drawing Sheets

Uncoupled: Microstrip Line $v_{prop}$ > Stripline $v_{prop}$

Fig. 8A

Coupled: Current injected in both directions into the Stripline

Fig. 8B

TERA-SAMPLE-PER-SECOND ARBITRARY WAVEFORM GENERATOR

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 111213.

BACKGROUND OF THE INVENTION

Software defined radios can use fast digital to analog converters to for digital passband modulation but still require analog modulators for higher frequencies. There is a need for an improved waveform generator.

SUMMARY

Disclosed herein is a tera-sample-per-second waveform generator comprising: a first transmission line, an anti-reflection load, a plurality of current sources, and a second transmission line. The first transmission line has a terminated end and an output end. The anti-reflection load is coupled to the terminated end of the first transmission line. Each of the plurality of current sources is configured to inject current into the first transmission line. The second transmission line is configured to feed the first transmission line with a seed signal through the plurality of current sources such that the second transmission line has a different time delay between current sources than the first transmission line, wherein the seed signal triggers the current sources to inject current into the first transmission line in order to generate an output waveform.

The waveform generator disclosed herein may also be described as comprising first and second transmission lines and a plurality of current sources. The first transmission line has a first propagation speed that is slower than a second propagation speed of the second transmission line. The plurality of current sources are disposed between the first and second transmission lines. The second transmission line is configured to provide an input clock signal to the first transmission line through the plurality of current sources such that a varying current is injected into the first transmission line. In this way, a varying voltage is produced that propagates down the first transmission line in both directions such that a resulting waveform is generated at an output of the first transmission line.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed waveform generator below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other embodiments described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
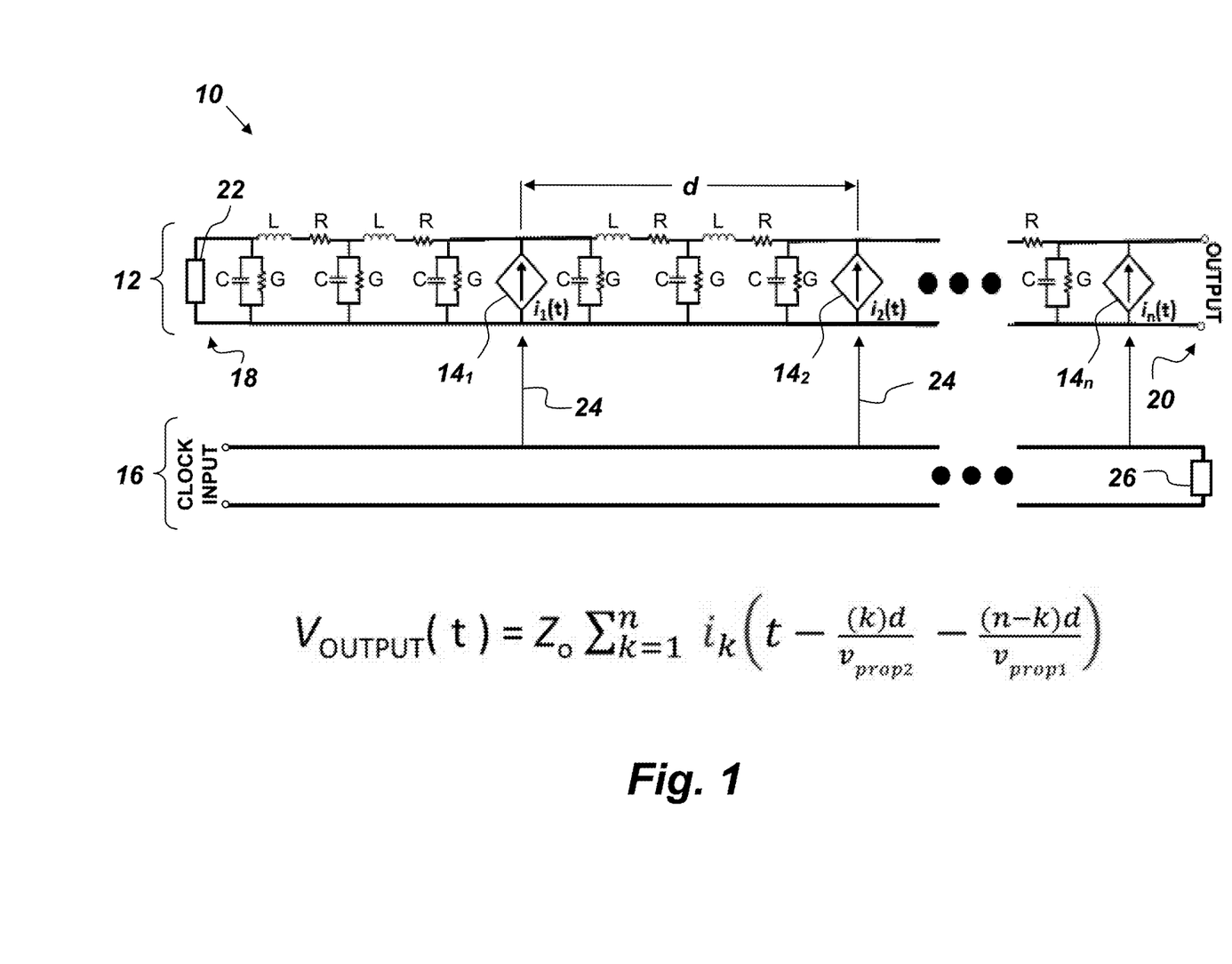
FIG. 1 is a schematic of an example embodiment of a tera-sample-per-second waveform generator.

FIG. 1 is a schematic of an example embodiment of a tera-sample-per-second waveform generator 10 (hereinafter referred to as waveform generator 10) that comprises, consists of, or consists essentially of a first transmission line 12, a plurality of current sources 14, and a second transmission line 16. The first transmission line 12 has a terminated end 18 and an output end 20. An anti-reflection load 22 is coupled to the terminated end 18 of the first transmission line 12. Each current source 14 is configured to inject current into the first transmission line 12. The second transmission line 16 is configured to feed the first transmission line with a seed signal 24 through the plurality of current sources 14 such that the second transmission line 16 has a different time delay between current sources 14 than the first transmission line 12. The seed signal 24 triggers the current sources 14 to inject current into the first transmission line 12 in order to generate an output waveform. The second transmission line 16, in this embodiment, is also terminated with an anti-reflection load 26.

Varying current injected into the first transmission line 12 will produce a varying voltage that will propagate down the first transmission line 12 in both directions. This voltage will be additive to other voltage signals propagating on the first transmission line (see FIG. 1 and Equation 1 below).

$$V_{OUTPUT}(t) = Z_o \sum_{k=1}^{n} i_k \left( t - \frac{(k)d}{v_{prop2}} - \frac{(n-k)d}{v_{prop1}} \right) \quad \text{(Eq. 1)}$$

In Equation 1, n represents the number of current sources 14, d is the distance between current sources 14, $v_{prop1}$ and $v_{prop2}$ represent the velocities of propagation in the first and second transmission lines 12 and 16 respectively, and k is an index of summation. For embodiments of the waveform generator 10 where the current sources 14 are synchronized, the time resolution of $V_{output}$ is the time it takes to propagate a signal between current sources ($d/v_{prop}$).

If t=0 for each current source 14 is defined by the seed signal 24 (also referred to as the clock signal herein) on a parallel transmission line (i.e. the second transmission line 16), traveling in the same direction as voltages contributing to $V_{output}$, then the time resolution of $V_{output}$ is the difference between the time it takes for each transmission line to propagate a signal between current sources $14|(d/v_{prop2}-d/v_{prop1})|$. The time between the beginning of when a current signal from the first current source $14_1$ arrives at the output and when the beginning of a current signal from the last current sources $14_n$ arrives at the output is $(t-dn/v_{prop2})-(t-d/v_{prop2}-(n-1)v_{prop1})=d(n-1)[1/v_{prop1}-1/v_{prop2}]$. Accordingly, the time interval between individual current sources 14 may be expressed as $d[1/v_{prop1}-1/v_{prop2}]$. In this way, the "sample frequency" is $1/\{d[1/v_{prop1}-1/v_{prop2}]\}=(v_{prop1})(v_{prop2})/\{d(v_{prop2}-v_{prop1})\}$ which can become arbitrarily small, by designing the clock transmission line (i.e., the second transmission line 16) to be just slightly faster than the output line (i.e., the first transmission line 12). In this manner, the total duration of an output waveform decreases at the same rate as the time between current sources 14.

Equation 1 may be rewritten as follows:

$$V_{OUTPUT}(t) = Z_o \sum_{k=1}^{n} i_k \left( t - k \left( \frac{d}{v_{prop2}} - \frac{d}{v_{prop1}} \right) - \frac{(n)d}{v_{prop1}} \right) \quad \text{(Eq. 2)}$$

If the time between current sources 14 is identical for both the first and second transmission lines 12 and 16, the resolution collapses to that of the current sources 14. Creating transmission lines that have different time delays between current sources can be achieved by using different effective dielectric constants for each transmission line, or by having different transmission line lengths between current sources.

A programmable waveform of duration $n|(d/v_{prop2}-d/v_{prop1})|$ may be generated by an actively-defined embodiment of the waveform generator 10 by having each current source 14 driven by a conventional digital to analog converter whose clock signal is delivered by the second transmission line 16.

Figure 2:
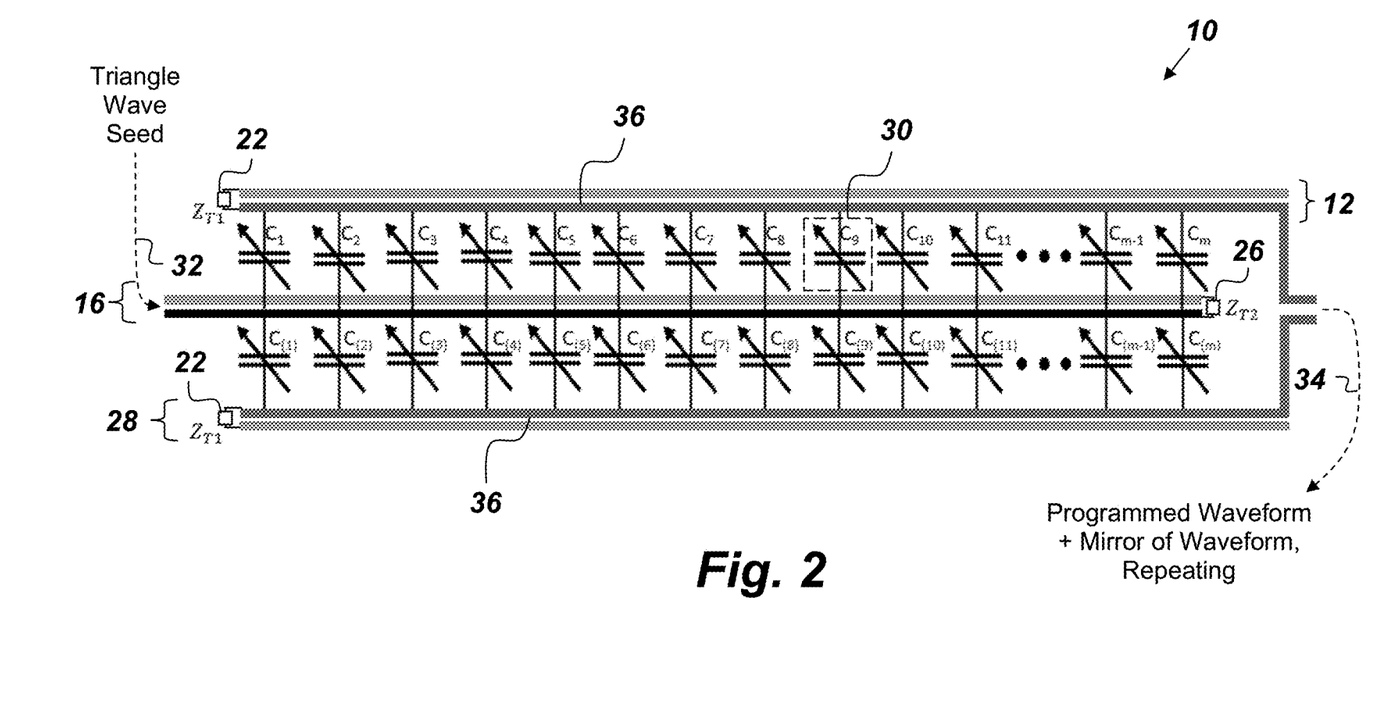
FIG. 2 is a schematic illustration of an embodiment of the waveform generator.

FIG. 2 is a schematic illustration of an embodiment of the waveform generator 10 further comprising a third transmission line 28. This embodiment of the waveform generator 10 is designed to generate a programmed waveform and a repeating mirror of the programmed waveform. As shown in FIG. 2, periodically along the length of the adjacent transmission lines 12, 16 and 28 are discrete capacitive couplers 30 configured to inject current into the first transmission line 12 and the third transmission line 28 as a function of the change in voltage over time on the faster transmission line (i.e., the second transmission line 16). Current may be injected into either side of the first and third transmission lines 12 and 28. In this embodiment of the waveform generator 10, the first and third transmission lines 12 and 28 have a slower velocity of propagation than the second transmission line 16. Here, a triangle waveform seed signal 32 with a period twice the difference of the two transmission line delays, $2(T_{d1}-T_{d2})$ sent down the faster transmission line (i.e., the second transmission line 16) will produce a waveform 34 on the slower, first transmission line 12, defined by the values of the discrete, periodically spaced coupling capacitors 30. Since the generated waveform 34 would be the integration of the capacitances over time and the capacitances cannot be negative, negative signals may be generated by coupling the second transmission line 16, which provides the clock/seed signal, to the negative side 36 of the first and third transmission lines 12 and 28 respectively. The current injected at each current source 14 will be coupling capacitance times the time derivative of the voltage difference between the second transmission line 16 and the differential lines (i.e., the first and third transmission lines 12 and 28). The output signal, or generated waveform 34, will be the sum of the time delayed current sources 14.

Figure 3:
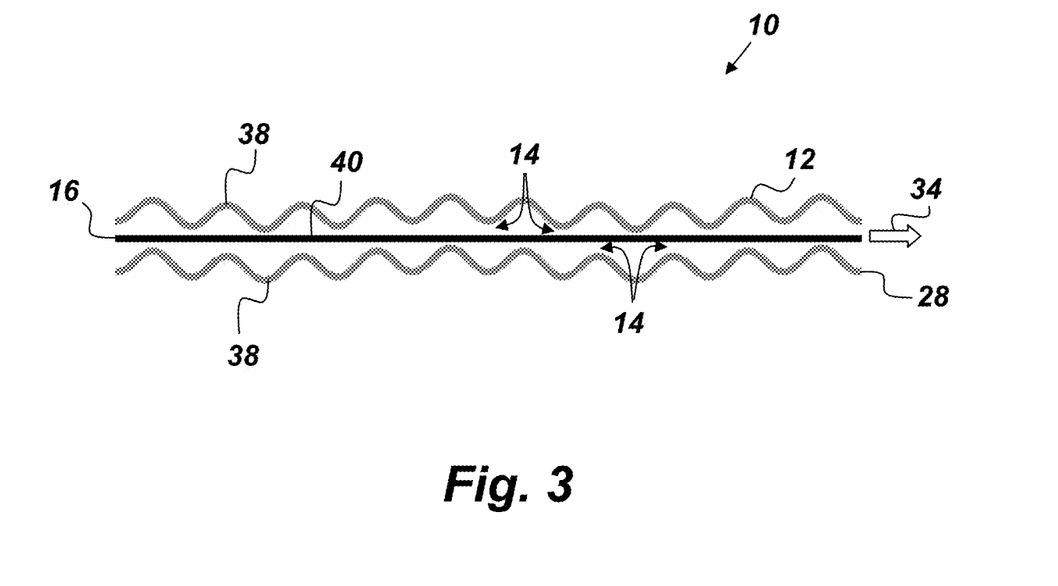
FIG. 3 is an illustration of a passively-defined variation of the waveform generator.

FIG. 3 is an illustration of a passively-defined variation of the waveform generator 10 that is configured to generate a predetermined waveform 34 by using capacitive coupling between the two transmission lines 12 and 16 as the current sources 14. In this embodiment of the waveform generator 10, the first and second transmission lines 12 and 16 are microstrip line waveguides with the same impedance, but with different transmission line delays Td. The first transmission line 12 has a transmission line delay $T_{d1}$ that is larger than the transmission line delay $T_{d2}$ of the second transmission line 16. This time delay difference may be accomplished, for example, by each of the first and second transmission lines 12 and 16 having a different velocity of propagation. Another way to impose a transmission line delay difference is to design the first and second transmission lines 12 and 16 such that they each have a different serpentine path length, such as is shown in FIG. 3. The two wavy microstrip lines 38 shown in FIG. 3 make up the differential output line (i.e., the first transmission line 12 and the third transmission line 28), while the straight microstrip line 40 is the seed input transmission line (i.e., the second transmission line 16) with the shorter transmission line delay than the first and third transmission lines 12 and 28. Coupling capacitance between the differential output line (i.e., the first transmission line 12 and the third transmission line 28) and the seed input transmission line (i.e., the second transmission line 16 may accomplished via the edge to edge capacitance of the microstrip lines.

Figure 4A:
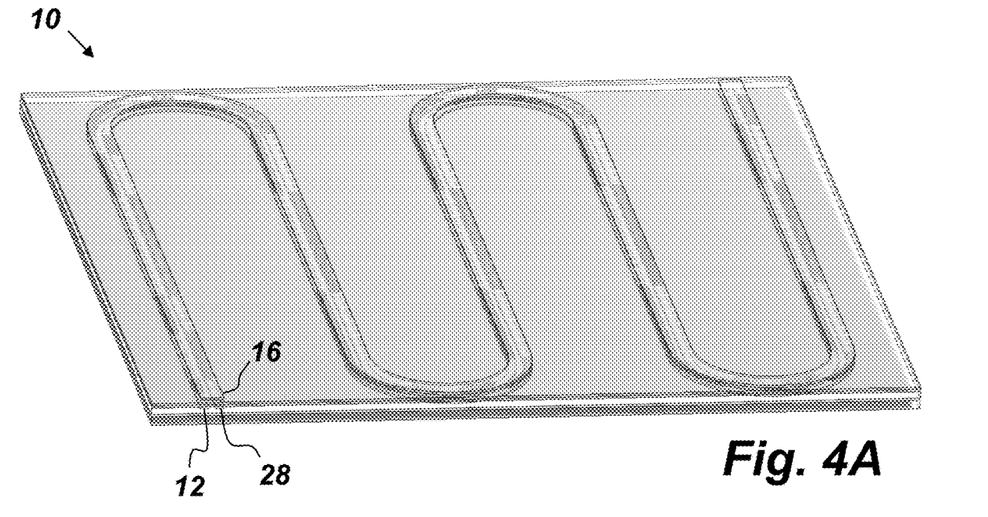
FIGS. 4A, 4B, and 4C are perspective view illustrations, in different orientations, of an example embodiment of the waveform generator.
Figure 4B:
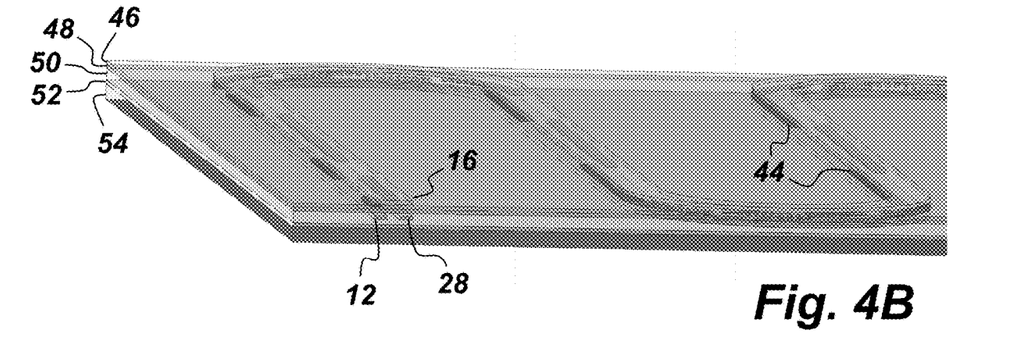
Figure 4C:
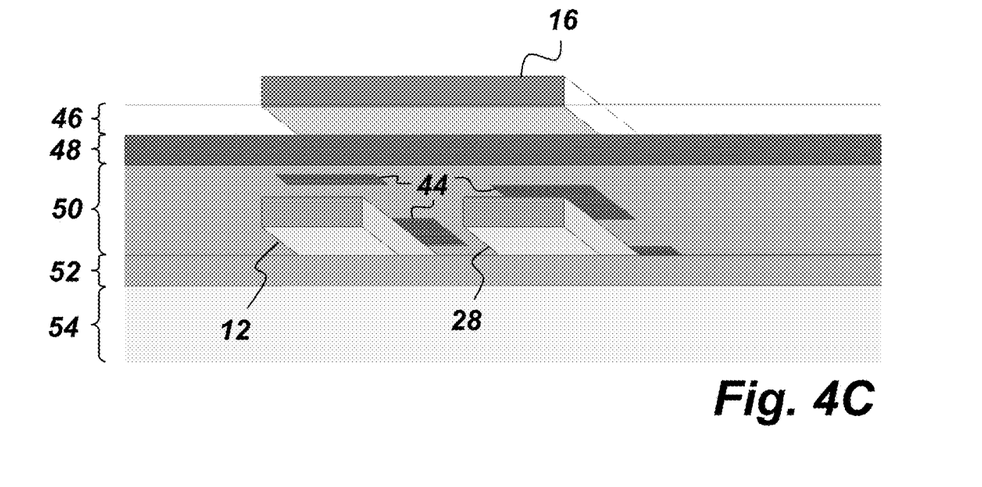

FIGS. 4A, 4B, and 4C are perspective view illustrations, in different orientations, of an example embodiment of the waveform generator 10. FIG. 4A is a perspective top-view illustration showing an overall configuration of this embodiment of the waveform generator 10. FIG. 4B is a partial top-view illustration wherein the various layers of this embodiment are shown. FIG. 4C is a perspective, partial, bottom-view illustration of this example of the waveform generator 10. This embodiment of the waveform generator 10 comprises a microstrip input as the second transmission line 16 disposed above two differential stripline waveguides that function as the first and third transmission lines 12 and 28. Current will propagate faster along the microstrip second transmission line 16 than along the stripline first and third transmission lines 12 and 28. The second transmission line 16 is shown as transparent in FIGS. 4A and 4B to facilitate viewing of the other features of the waveform generator 10. The current sources 14, in this embodiment, are coupling capacitors that are defined by holes 44 in the microstrip ground plane 48. The waveform output generated by this version of the waveform generator 10 may be specified by the size and placement of the holes 44 in the microstrip ground plane 48. The waveform generator 10 pushes the frequency limits of what waveforms can be arbitrarily generated. The following layers are illustrated in FIGS. 4B and 4C: a first microstrip dielectric layer 46, the microstrip ground plane 48 (which includes the holes 44), a stripline dielectric layer 50, a second microstrip dielectric layer 52, and a bottom stripline ground layer 54.

Figure 5A:
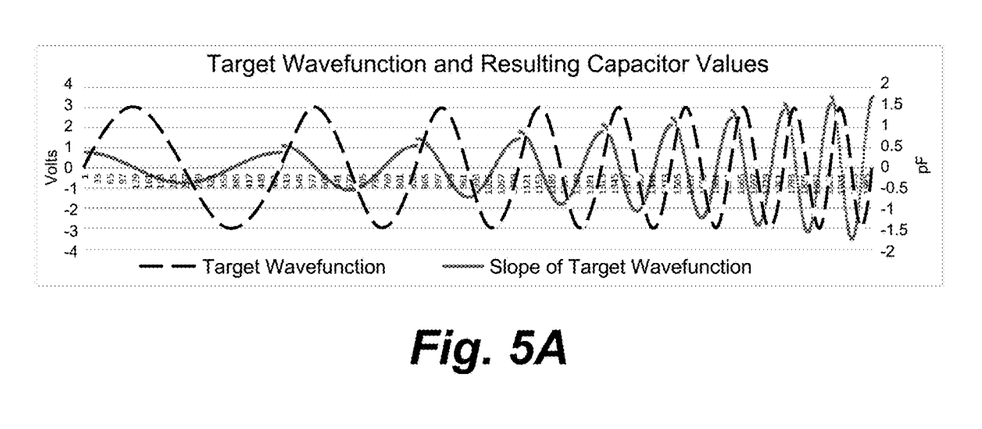
FIGS. 5A, 5B, and 5C are graphical plots of information.
Figure 5B:
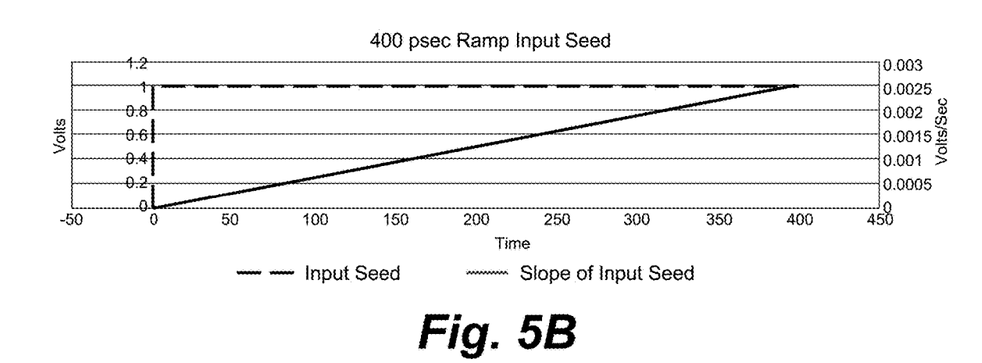
Figure 5C:
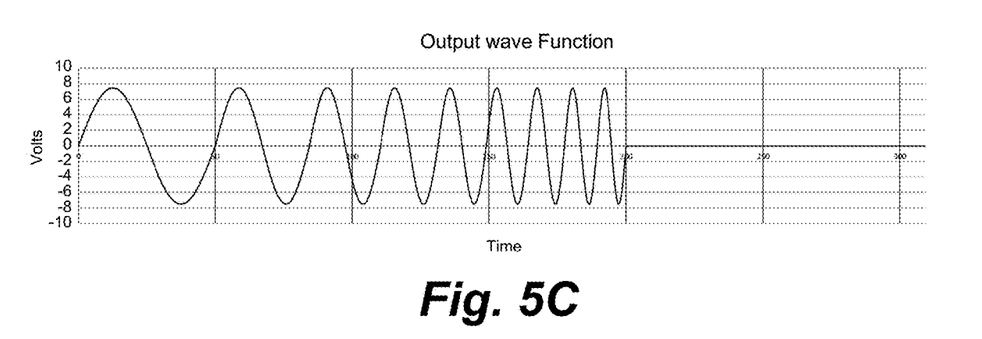

FIG. 5A is a plot showing an example target wave function and resulting capacitor values for an embodiment of the waveform generator 10. In FIG. 5A, the capacitances to generate a chirp waveform are chosen as the sampled slope of the desired waveform. For embodiments of the waveform generator 10 where the current sources 14 are equidistant, the total duration of the waveform is the number of current sources times the difference in time it takes each waveguide to propagate between current sources. FIG. 5B is a plot showing the output of the waveform generator 10 in response to a 400 psec ramp input seed signal over time. FIG. 5C is a plot of the output wave function resulting from the 400 psec ramp input seed signal shown in FIG. 5B.

Figure 6A:
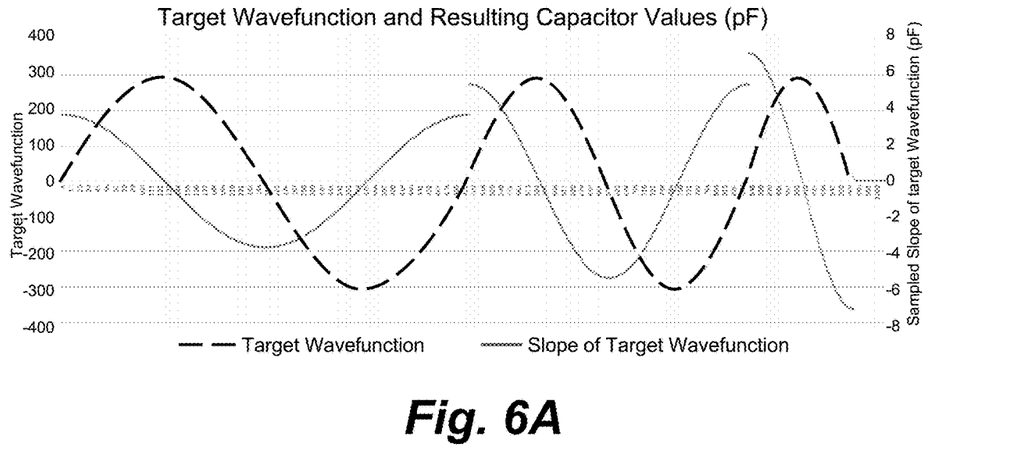
FIGS. 6A, 6B, and 6C are graphical plots of information.
Figure 6B:
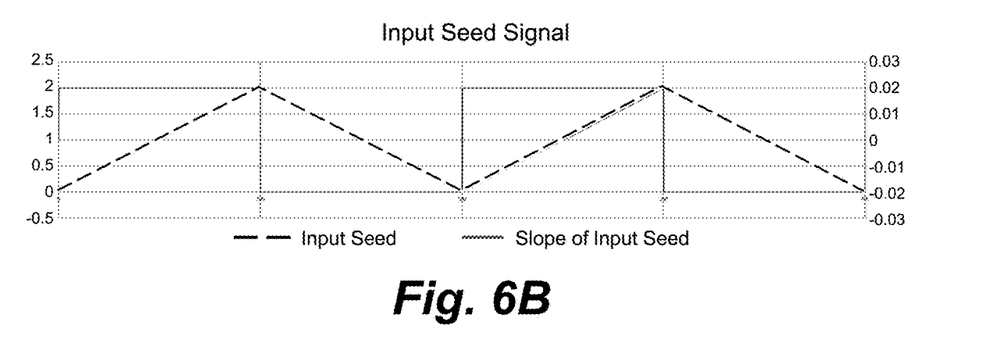
Figure 6C:
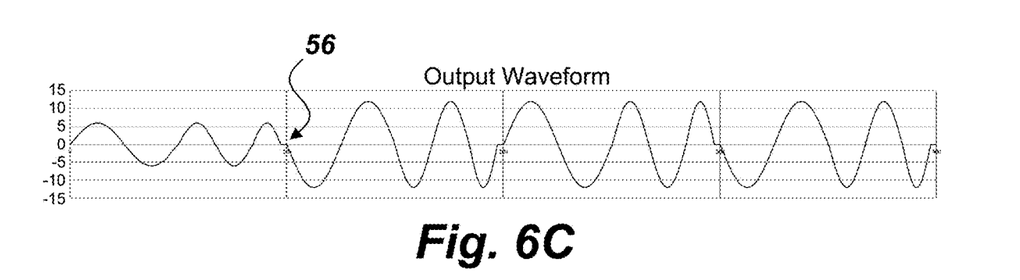

FIG. 6A is a plot showing another example target wave function and resulting capacitor values for an embodiment of the waveform generator 10. FIG. 6A shows the target waveform and capacitances for a shorter chirp waveform. FIG. 6B is a plot of an example triangle wave input seed signal. FIG. 6C shows the resulting repeating mirrored waveform when the triangle wave shown in FIG. 6B is used as the seed waveform for the coupling capacitances of FIG. 6A. As shown in FIG. 6C, there is a gap 56 between repeated, mirrored, wave functions caused by having the seed wave function's period slightly longer than twice the output wave function's period.

Figure 7A:
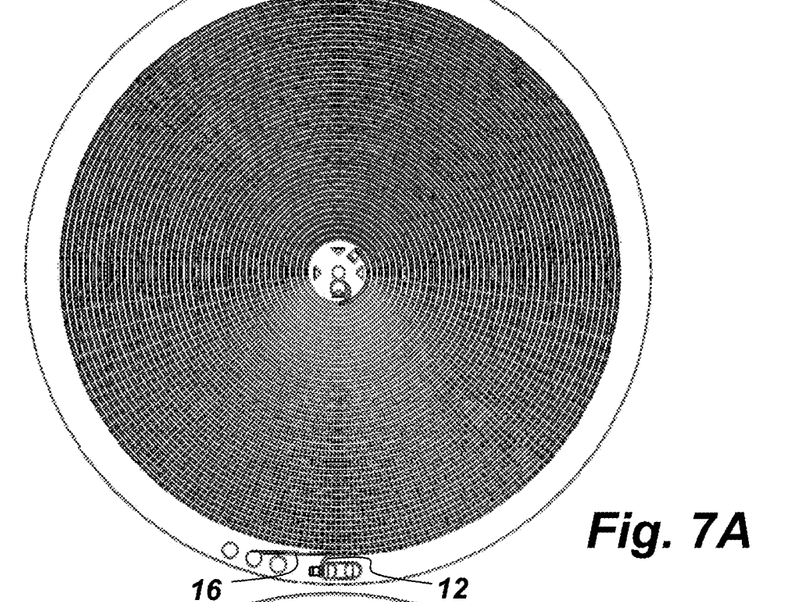
FIGS. 7A and 7B are illustrations of an example embodiment of the waveform generator.
Figure 7B:
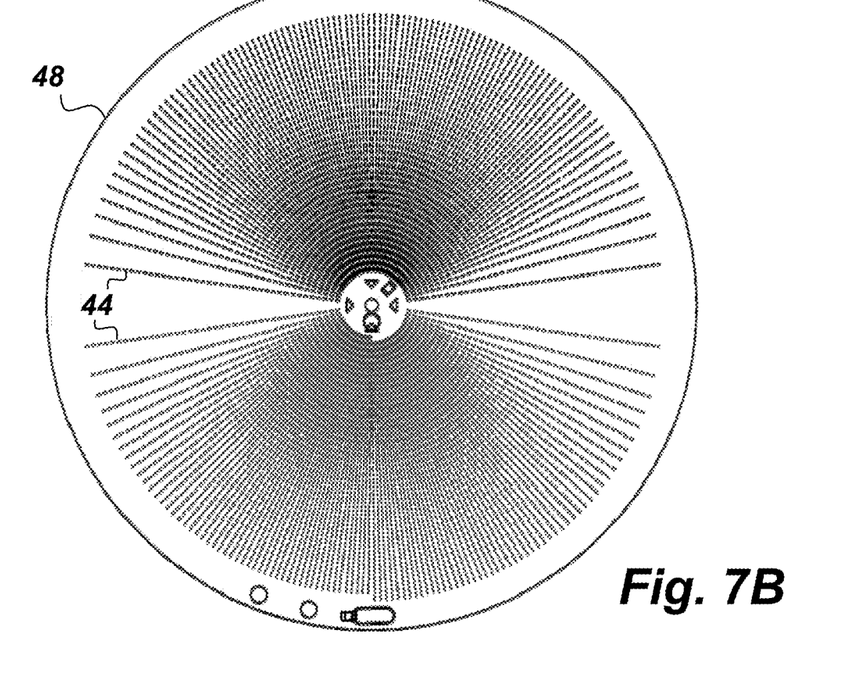

FIGS. 7A and 7B are illustrations of an example embodiment of the waveform generator 10 capable of generating submillimeter chirp waveforms. FIG. 7A shows an example pattern that may be used for both a microstrip line version of the second transmission line 16 and a stripline version of the first transmission line 12. FIG. 7B shows an example ground layer hole pattern for the ground layer 48 that may be disposed between the first and second transmission lines 12 and 16 to enable capacitive coupling at each hole 44.

Figure 8A:
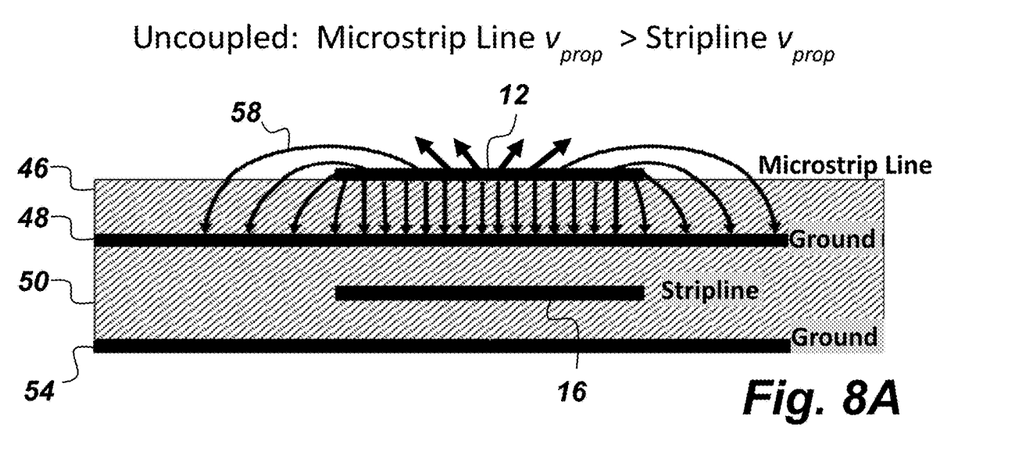
FIGS. 8A and 8B are illustrations of example embodiments of the waveform generator.
Figure 8B:
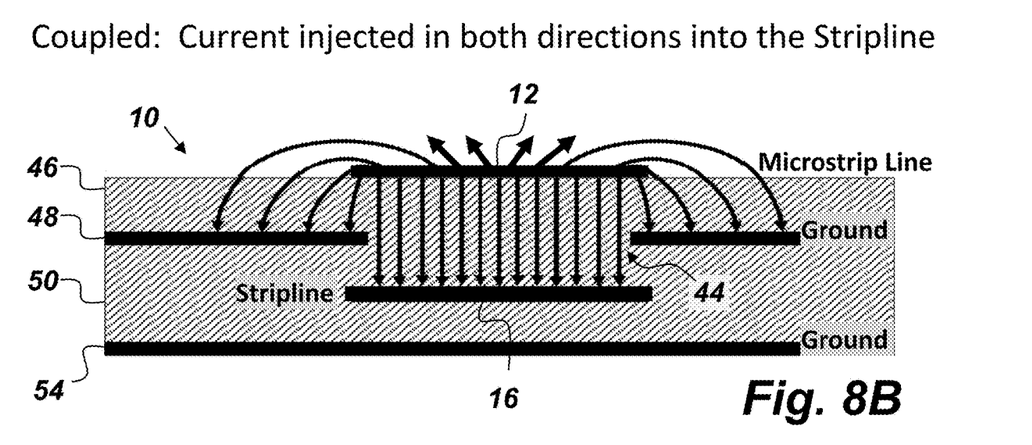

FIGS. 8A and 8B are cross-sectional, side-view illustrations of the embodiment of the waveform generator 10 shown in FIGS. 7A and 7B, which illustrations show electric field lines 58. FIG. 8A, shows the field distribution of the seeding transmission line 16 when shielded from the first transmission line 12. FIG. 8B shows the field distribution of the seeding second transmission line 16 when coupled to the first transmission line 12 through a hole 44. The waveform generator 10 can be realized using fixed coupling capacitor values producing a pre-defined waveform or by using paired tunable capacitors that can produce programmed, desired waveforms or by using digital-to-analog driven current sources. The waveform generator 10 can be realized using waveguides with varying velocities of propagation or waveguides with periodically varying path length.

From the above description of the tera-sample-per-second waveform generator, it is manifest that various techniques may be used for implementing the concepts of the waveform generator 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the waveform generator 10 is not limited to the particular embodiments described herein, but is capable of many embodiments without departing from the scope of the claims.

I claim:

1. A tera-sample-per-second waveform generator comprising:
   a first transmission line having a terminated end and an output end;
   an anti-reflection load coupled to the terminated end of the first transmission line;
   a plurality of current sources, wherein each current source is configured to inject a current into the first transmission line; and
   a second transmission line configured to feed the first transmission line with a seed signal through the plurality of current sources such that the second transmission line has a different time delay between the plurality of current sources than the first transmission line, wherein the seed signal triggers the plurality of current sources to inject the current into the first transmission line in order to generate an output waveform.

2. The generator of claim 1, wherein the seed signal is a clock source.

3. The generator of claim 1, each transmission line has a different effective dielectric constant thereby creating the different time delays between current sources.

4. The generator of claim 1, wherein the different time delay between the plurality of current sources is achieved by having different transmission line lengths between the plurality of current sources.

5. The generator of claim 4, wherein the first transmission line has a different velocity of propagation than the second transmission line.

6. The generator of claim 4, wherein the first and second transmission lines have a different serpentine path length from each other.

7. The generator of claim 6, wherein the current sources are instances of capacitive coupling between the first transmission line and the second transmission line such that second transmission line behaves as a passive waveguide whose shape passively dictates a shape of the output waveform.

8. The generator of claim 7, wherein the seed signal is a triangle wave form with a period twice a transmission line delay difference $T_{d1}-T_{d2}$, where $T_{d1}$ is a line delay of the first transmission line and $T_{d2}$ is a line delay of the second transmission line.

9. The generator of claim 1, wherein the current sources are digitally tunable capacitors configured to periodically couple the first and second transmission lines so as to produce the output waveform with greater than terra hertz sampling rates.

10. The generator of claim 9, wherein the output waveform has a duration of $n|(d/v_{prop2}-d/v_{prop1})|$, where n is a number of current sources, d is a distance between current sources, $v_{prop1}$ is a speed of current propagation in the first transmission line and $v_{prop2}$ is a speed of current propagation in the second transmission line.

11. The generator of claim 1, wherein each of the plurality of current sources is driven by a digital to analog converter whose clock signal is delivered by the second transmission line.

12. The generator of claim 1, wherein the first and second transmission lines' impedance is the same, wherein the first transmission line comprises two, serpentine microstrip lines forming a differential output transmission line, wherein the second transmission line is configured as a seed input transmission line that comprises a single microstrip line disposed between the two serpentine microstrip lines and having a shorter transmission line delay and the first transmission line, and wherein the current sources comprise edge to edge capacitance of the first and second transmission lines.

13. The generator of claim 1, further comprising a third transmission line disposed in parallel to the first transmission line, wherein the first and third transmission lines form a differential stripline waveguide, wherein the second transmission line is a microstrip waveguide disposed above the first and third transmission lines, and wherein the second transmission line is capacitively coupled to the first and third transmission lines through holes in a microstrip ground layer.

14. A waveform generator comprising:
a first transmission line having a first propagation speed;
a second transmission line having a second propagation speed that is faster than the first propagation speed;
a plurality of current sources disposed between the first and second transmission lines, wherein the second transmission line is configured to provide an input clock signal to the first transmission line through the plurality of current sources such that a varying current is injected into the first transmission line thereby producing a varying voltage that propagates down the first transmission line in both directions such that a resulting waveform is generated at an output of the first transmission line.

15. The waveform generator of claim 14, wherein the input clock signal is added to other voltage signals already propagating down the first transmission line.

16. The waveform generator of claim 14, wherein the first transmission line is a stripline waveguide disposed between an upper ground layer and a lower ground layer.

17. The waveform generator of claim 16, wherein the second transmission line is a microstrip waveguide disposed above the first transmission line.

18. The waveform generator of claim 17, wherein the upper ground layer comprises a plurality of through holes disposed in a predefined pattern, and wherein the plurality of current sources are instances of capacitive coupling between the first and second transmission lines though the holes.

19. The waveform generator of claim 17, further comprising a third transmission line disposed between the upper and lower ground layers such that the first and third layers form a differential stripline that is capacitively coupled to the second transmission line at every hole in the upper ground layer.

20. The waveform generator of claim 14, wherein the current sources are instances of edge-to-edge coupling of the first and second transmission lines.

* * * * *